United States Patent
Fain et al.

(10) Patent No.: US 7,233,899 B2
(45) Date of Patent: Jun. 19, 2007

(54) SPEECH RECOGNITION SYSTEM USING NORMALIZED VOICED SEGMENT SPECTROGRAM ANALYSIS

(76) Inventors: Vitaliy S. Fain, 73 Outlook Dr., #23, Worcester, MA (US) 01602; Samuel V. Fain, 1223 Beacon St., #211, Brookline, MA (US) 02446

( * ) Notice: Subject to any disclaimer, the term of this patent is extended or adjusted under 35 U.S.C. 154(b) by 1162 days.

(21) Appl. No.: 10/094,696

(22) Filed: Mar. 7, 2002

(65) Prior Publication Data
US 2002/0128834 A1    Sep. 12, 2002

Related U.S. Application Data

(60) Provisional application No. 60/274,786, filed on Mar. 12, 2001.

(51) Int. Cl.
G10L 11/06    (2006.01)
G10L 15/00    (2006.01)
G10L 15/04    (2006.01)

(52) U.S. Cl. .................. 704/251; 704/208; 704/254
(58) Field of Classification Search ............. 704/251, 704/208, 254; 381/94.2
See application file for complete search history.

(56) References Cited

U.S. PATENT DOCUMENTS

| | | | | |
|---|---|---|---|---|
| 5,428,707 A * | 6/1995 | Gould et al. | | 704/231 |
| 5,745,649 A * | 4/1998 | Lubensky | | 704/232 |
| 5,799,276 A * | 8/1998 | Komissarchik et al. | | 704/251 |
| 5,799,279 A * | 8/1998 | Gould et al. | | 704/275 |
| 5,903,867 A * | 5/1999 | Watari et al. | | 704/270 |
| 5,907,826 A * | 5/1999 | Takagi | | 704/251 |
| 5,924,066 A * | 7/1999 | Kundu | | 704/232 |
| 6,018,736 A | 1/2000 | Gilai et al. | | |
| 6,055,495 A * | 4/2000 | Tucker et al. | | 704/210 |
| 6,125,346 A * | 9/2000 | Nishimura et al. | | 704/258 |
| 6,161,087 A * | 12/2000 | Wightman et al. | | 704/215 |
| 6,185,527 B1 * | 2/2001 | Petkovic et al. | | 704/270 |
| 6,256,630 B1 | 7/2001 | Gilai et al. | | |
| 6,292,775 B1 * | 9/2001 | Holmes | | 704/209 |
| 6,453,284 B1 * | 9/2002 | Paschall | | 704/208 |

* cited by examiner

*Primary Examiner*—Tālivaldis Ivars Šmits
*Assistant Examiner*—Myriam Pierre
(74) *Attorney, Agent, or Firm*—AKC Patents; Aliki K. Collins

(57) ABSTRACT

Computer comparison of one or more dictionary entries with a sound record of a human utterance to determine whether and where each dictionary entry is contained within the sound record. The record is segmented, and for each vocalized segment a spectrogram is obtained, and for other segments symbolic and numeric data are obtained. The spectrogram of a vocalized segment is then processed using a method selected from a group consisting of a triple time transform, a triple frequency transform, a linear-piecewise-linear transform, and combinations thereof, to decrease noise and to eliminate variations in pronunciation. Each entry in the dictionary is then compared with every sequence of segments of substantially the same length in the sound record. The comparison takes into account the formant profiles within each vocalized segment and symbolic and numeric data for other segments are obtained in the record and in the dictionary entries.

41 Claims, 13 Drawing Sheets

SPEECH RECOGNITION SYSTEM USING NORMALIZED VOICED SEGMENT SPECTROGRAM ANALYSIS

RELATED APPLICATION

This application claims the benefit of U.S. Provisional Application No. 60/274,786, filed on Mar. 12, 2001. The entire teachings of the above application are incorporated herein by reference.

BACKGROUND

All computer speech processing systems have to establish a match between the sound of an utterance (or a portion thereof) and an entry in the system's dictionary. A dictionary entry may be a sound or a phoneme (e.g., "v"), a syllable (e.g., "-ver-"), a word (e.g., "version"), or a phrase ("create a version").

Computer speech processing systems generally fall into two categories: dictation systems and command systems. Dictation systems (e.g., IBM ViaVoice and Dragon Systems Naturally Speaking) usually work in conjunction with a word processing program to allow a user to dictate text into an electronic document. Command systems (e.g., Apple Speech Recognition under MacOS) map speech to computer commands.

Computer dictation systems are designed to break an utterance into a sequence of entries in a dictionary. Such systems identify known phrases and words in the speech and try to handle the unfamiliar words by guessing their spelling or asking the user for additional input. If a pronounced word is not in the dictionary, there is no guarantee that the dictation system will spell it correctly (unless the user spells it explicitly, thus largely defeating the purpose of using the dictation system). For this reason, the dictation systems benefit from and are optimized for very large dictionaries.

Computer command systems are designed to recognize phrases representing the commands the computer can perform. A computer command system would match the sound of user saying "Save as Vitaliy's application in directory Fain documents" with the word processor "Save As" command which requires certain parameters, then do its best spelling with "Vitaliy's application," and finally match the sound of "Fain documents" with a name in a list of directories available to the system.

Current computer speech processing systems with large active dictionaries are not designed or optimized for the task of efficiently determining whether and where a human voice utterance contains a given word or phrase. Even when they can perform this task, they perform it inefficiently. This task, however, is important in a variety of contexts, for example, in an efficient implementation of a natural language understanding system as described in co-pending U.S. patent application Ser. No. 10/043,998 titled "Method and Apparatus Providing Computer Understanding and Instructions from Natural Language" filed on Jan. 11, 2002, the entire teaching of which are incorporated herein by reference.

SUMMARY

Embodiments of the present invention include a system and a method for efficiently determining, for a given large dictionary, whether and where the sound of a human utterance contains one or more dictionary entries. A dictionary entry may be a phoneme, a sequence of phonemes, a syllable, a word, or a phrase. Dictionary entries may be grouped into subdictionaries within the dictionary.

First, the sound of the utterance is stored in a digital form in a computer memory unit. Then, for each dictionary entry, the length of the stored utterance is scanned to determine if this dictionary entry appears anywhere in the utterance. This scanning can be done by dividing the stored utterance into segments and then performing segment-by-segment comparison of the stored utterance with the dictionary entry.

For example, if the stored utterance contains segments S1, S2, S3, etc. and the dictionary entry's phonetic realization is two segments long, the scanning would determine whether and how well the dictionary entry matches the pairs (S1, S2), (S2, S3), (S3, S4), etc. Such tested sequences of segments will be called tested segment sequences. The method described is called the Optimal Inverse Method (OIM).

In a particular embodiment, the stored utterance is divided into segments of several types, including: vowel stressed, vowel unstressed, adjacent voiced consonant, voiced fricative, voiceless fricative, voiced plosive, voiceless plosive, pause, or unrecognized (if a segment cannot be recognized as any one of the defined types). Accordingly, each dictionary entry includes descriptions of segments produced by a human pronouncing the entry. This description may describe only to what type a segment belongs or may include more detailed description of the segment. This description must be general enough to account for differences among speakers. Each dictionary sequence of segments is called a dictionary segment sequence.

In a particular embodiment, some of the segments used to compare the stored utterance sequences with the dictionary entries are continuous voiced segments. For such continuous voiced segments the comparison is done using their spectrograms. The spectrograms of segments representing voiced sounds reflect the relative prominence of sound frequencies over the duration of the segment. Methods that normalize the stored continuous voiced segments are used before or simultaneously with their comparison of the dictionary entry. The normalization is used to account for differences between the same words pronounced at different times by different speakers and to reduce the noise in the sound recording.

In a particular embodiment, three normalization methods are used in various combinations. The first two methods (Triple Frequency Transform and Triple Time Transform) are designed to account for variability of voice pitch of different speakers and of the same speaker at different times and also to eliminate some of the noise potentially present in the sound record. They involve first determining the basic frequency of the speaker's voice pitch during a continuous voiced segment and then obtaining the spectrogram of the continuous voiced segment by measuring the intensity of the sound during this segment only at frequencies that are multiples of this basic frequency.

The third method (Linear-Piecewise-Linear Transform) is designed to account for variability of relative sizes of the elements of the voice tract (mouth, nose, and throat cavities, etc.) between different people. Each resonant cavity within the voice tract, over the duration of a continuous voiced segment, produces a prominent peak on the segment's spectrogram. This peak is called a formant. This method involves locating the formants on a segment's spectrogram, scaling them, and then moving them along the frequency axis to the positions suggested by the dictionary entry with which the segment is compared; accordingly, the dictionary entry must describe what the formants are supposed to look like when the dictionary entry is pronounced.

In a particular embodiment the Triple Frequency Transform is used with the Linear-Piecewise-Linear Transform method for normalization. In another embodiment the Triple Time Transform is used with the Linear-Piecewise-Linear Transform method for normalization.

In a particular embodiment, a frequency corridor rejection method is used to quickly determine when a tested segment sequence is incapable of matching a dictionary entry. During the comparison between a tested segment sequence and a dictionary entry, but before the third normalization method is applied, if the average frequency of any formant within the tested segment sequence is outside the acceptable range stored for this formant in the dictionary entry, the tested sequence is rejected. To use the frequency corridor rejection method, each dictionary entry must contain, for each formant within it, an acceptable range of values of average frequency for this formant.

BRIEF DESCRIPTION OF THE DRAWINGS

The foregoing and other objects, features and advantages of the invention will be apparent from the following more particular description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Recognition of known elements of human speech (phonemes, phoneme groups, syllables, words, or phrases) in the sound of a human utterance is fundamental for any computer application where the operation of a computer depends on what the computer user says. Such applications include, for example, dictation systems, where the text pronounced by a computer user is stored in the computer in textual form and command systems, where the text pronounced by a computer user forms a command to be performed by a computer. One particular natural language understanding system is described in co-pending U.S. patent application Ser. No. 10/043,998 titled "Method and Apparatus Providing Computer Understanding and Instructions from Natural Language" filed on Jan. 11, 2002, the entire teaching of which are incorporated herein by reference.

Figure 1:
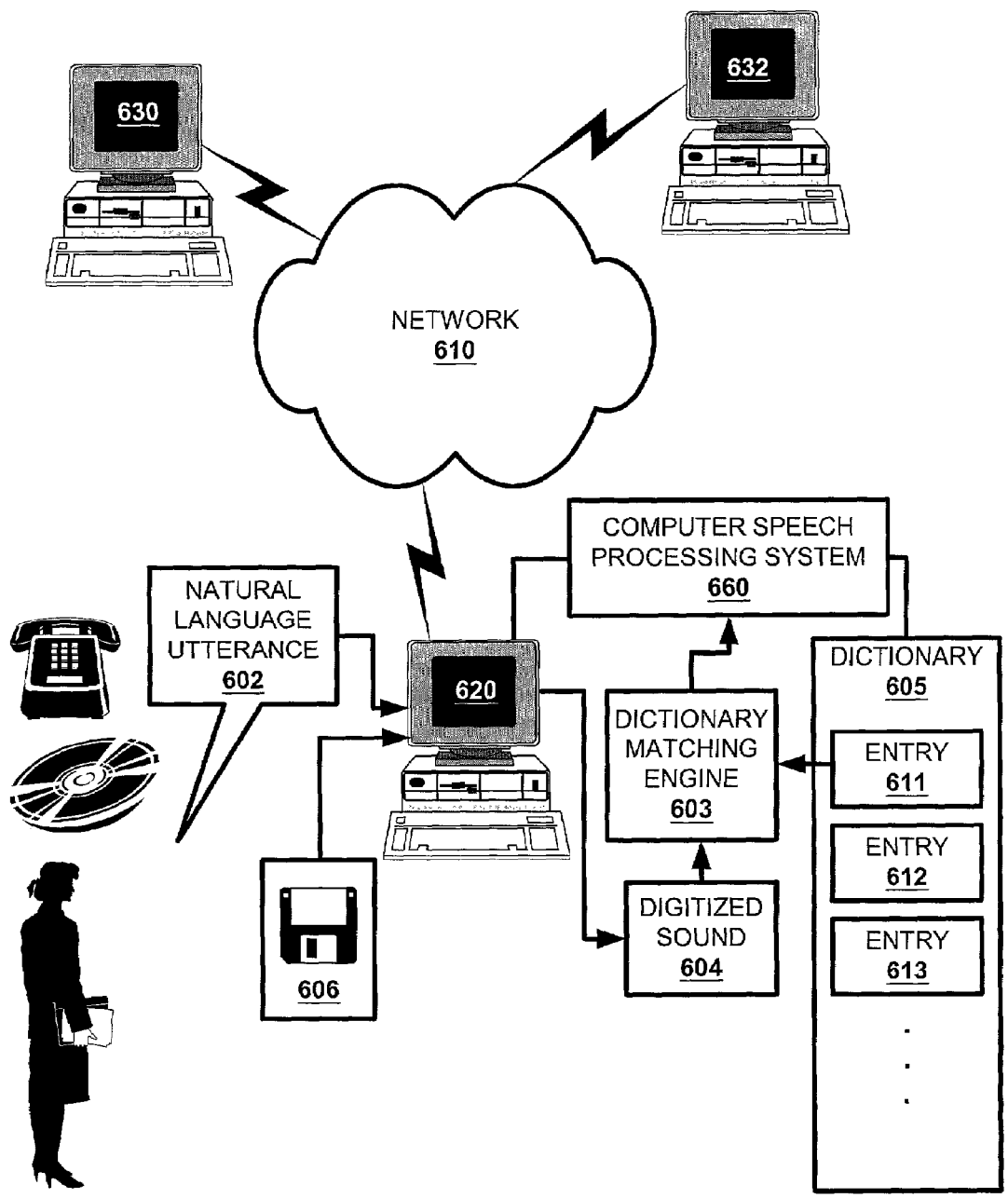
FIG. 1 illustrates a computer system on which an embodiment of the present invention is implemented.

FIG. 1 illustrates a computer network 610 on which an embodiment of the present invention is implemented. A client computer 620 provides processing, storage, and input/output devices for providing computer speech processing. The client computer 620 can also be linked to a communications network 610 having access to other computing devices, including server computers 630 and 632. The communications network 610 can be part of the Internet, a worldwide collection of computers, networks and gateways that currently use the TCP/IP suite of protocols to communicate with one another. The Internet provides a backbone of high-speed data communication lines between major nodes or host computers, consisting of thousands of commercial, government, educational, and other computer networks, that route data and messages. In another embodiment of the present invention, the processing, storage, and input/output devices for providing computer speech processing can be contained on a stand-alone computer.

A client computer 620 provides sound recording hardware (e. g., microphone) for accepting natural language utterances 602 and storing them in digitized form 604. These utterances may be live, recorded, remote, or artificially generated. Alternatively, the digitized sound 604 can be obtained from a file 606 or over the network 610. The computer speech processing system 660 receives information from a dictionary matching engine 603 regarding whether and where the stored utterance 604 contains one of the entries 611, 612, 613 in dictionary 605. Dictionary 605 may comprise a number of subdictionaries.

Figure 2:
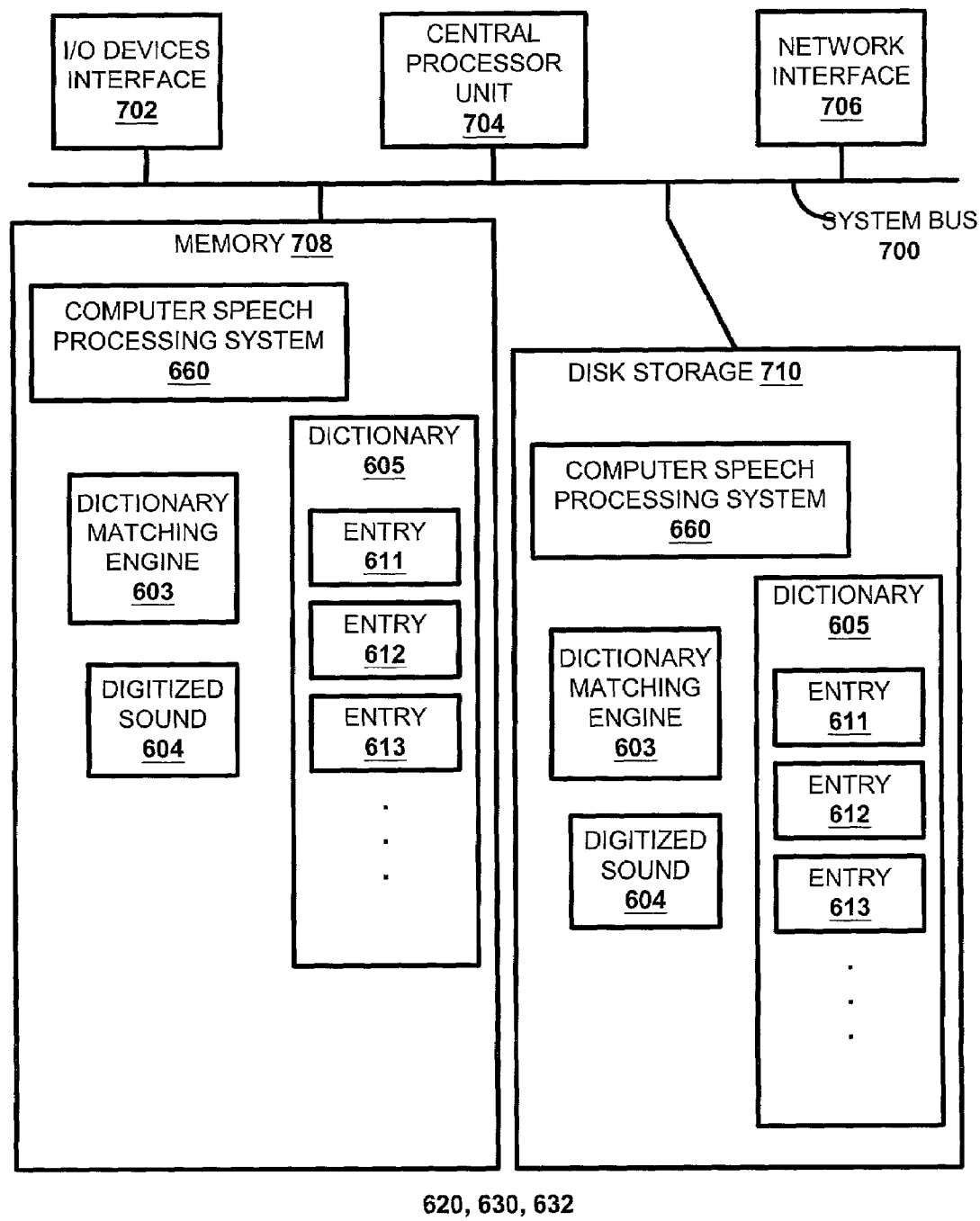
FIG. 2 illustrates the internal structure of computer of FIG. 1.

FIG. 2 illustrates the internal structure of a computer (e.g., 620, 630, or 632) in the computer network 610 of FIG. 1. Each computer contains a system bus 700, where a bus is a set of hardware lines used for data transfer among the components of a computer. A bus 700 is essentially a shared conduit that connects different elements of a computer system (e.g., processor, disk storage, memory, input/output ports, network ports, etc.) that enables the transfer of information between the elements. Attached to system bus 700 is an I/O device interface 702 for connecting various input and output devices (e.g., microphone, plotters, displays, speakers, etc.) to the computer. A network interface 706 allows the computer to connect to various other devices attached to a network (e.g., network 610). A memory 708 provides volatile storage for computer software instructions (e.g., computer speech processing system 660 and dictionary matching engine 603) and data structures (e.g., dictionary 605 and digitized sound 604) used to implement an embodiment of the present invention. Disk storage 710 provides non-volatile storage for computer software instructions (e.g., computer speech processing system 660 and dictionary matching engine 603) and data structures (e.g., dictionary 605 and digitized sound 604) used to implement an embodiment of the present invention.

A central processor unit 704 is also attached to the system bus 700 and provides for the execution of computer instructions (e.g., computer speech processing system 660 and dictionary matching engine 603), thus allowing the computer to process the sound of human utterances.

Figure 3A:
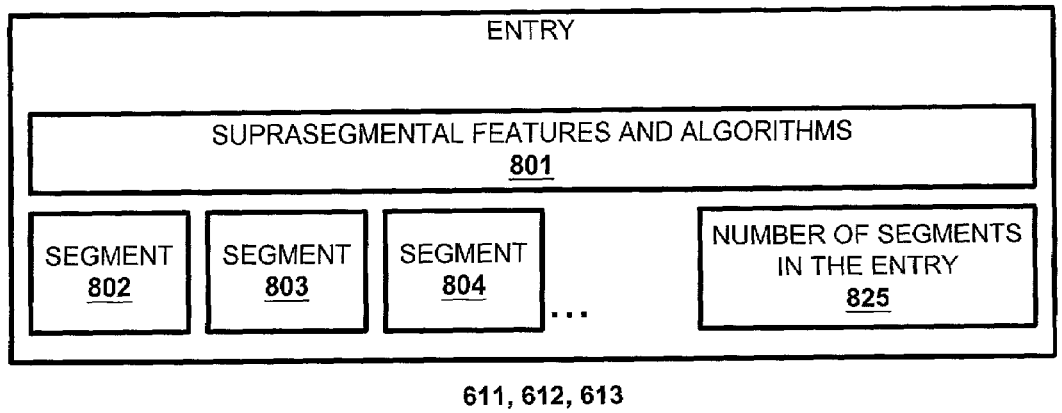
FIG. 3A illustrates the structure of a dictionary entry.

FIG. 3A illustrates the structure of a dictionary entry 611, 612, or 613 in an embodiment of the present invention. The entries 611, 612, and 613 contain information about each individual segment 802, 803, 804 within that entry.

In an embodiment of the present invention, the segments belong to several types, including: vowel stressed, vowel unstressed, adjacent voiced consonant (i.e., a voiced consonant adjacent to a vowel, a voiced consonant, or another adjacent voiced consonant), voiced fricative, voiceless fricative, voiced plosive, voiceless plosive, pause, and unrecognized (if a segment cannot be recognized as any one of the defined types). Accordingly, any dictionary entry 611, 612, or 613 includes description of segments produced by a human pronouncing the entry. This description may describe only to what type a segment belongs or may include more detailed description of the segment.

Additionally, a dictionary entry 611, 612, or 613 may contain suprasegmental information 801 describing, for example, the relative strength or duration of each segment within that dictionary entry. The dictionary entry 611, 612, or 613 may also contain some algorithms optimized specifically for detection of this entry within a human utterance. These algorithms may be associated with individual segments 802, 803, or 804 or with the entire entry 801. In an implementation of the present invention, the number of segments 802, 803, or 804 for each entry is stored, 825, within the entry 611, 612, or 613.

The dictionary may be loaded using a manual process or an interactive process. The process involves analyzing a spectrogram of voiced segment to determine ridges. The ridges are used to distinguish and identify real formants within the voiced segment from external sounds. This allows for the capturing of information on vowel sounds, which is especially important. The formant information can then be stored in the dictionary for later use in comparing voiced segments.

Figure 3B:
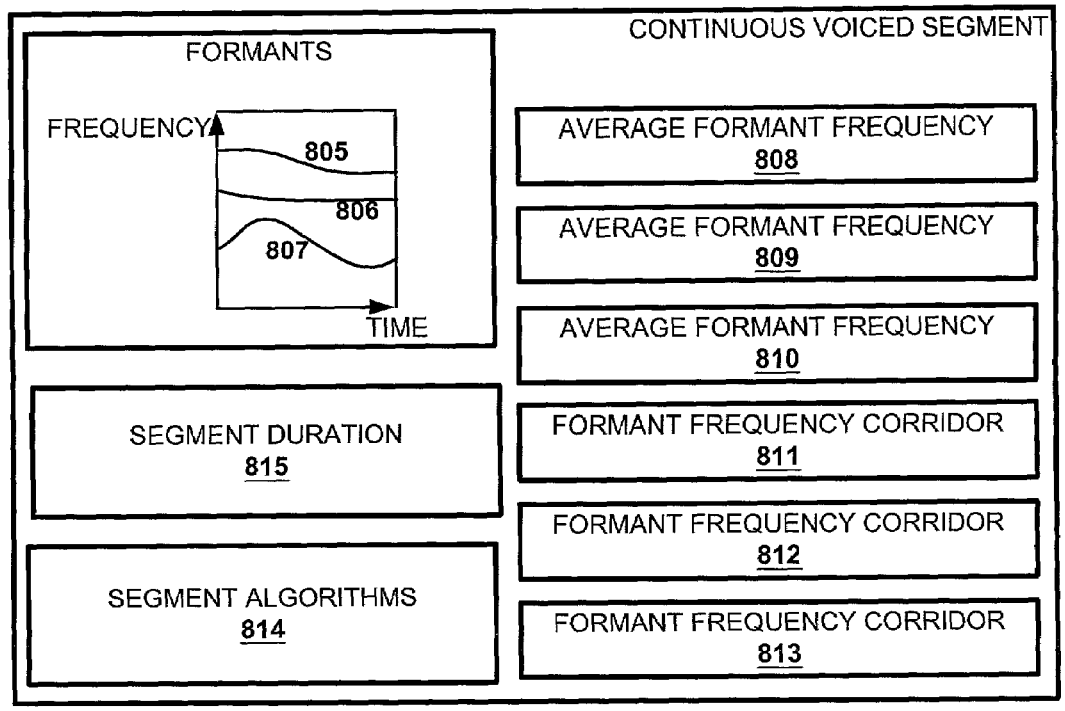
FIG. 3B illustrates the structure of a continuous voiced segment description within a dictionary entry.

In an implementation of the present invention, some segments are continuous voiced segments. FIG. 3B illustrates the structure of a continuous voiced segment description within a dictionary entry. FIG. 3B shows the information contained in the dictionary 605 for a continuous voiced segment 802 within an entry 611 in an implementation of the present invention. Each resonant cavity in the human voice tract, over the duration of a continuous voiced segment, produces at least one prominent peak on the segment's spectrogram. This peak is called a formant. In an embodiment of the present invention, for each continuous voiced segment 802 the dictionary entry 611 describes the segment's formants in a standard realization form. This description includes the contour of each formant 805, 806, and 807, the segment duration 815, and the time averaged frequency for each formant 808, 809, and 810. This description also includes the corridors, 811, 812, or 813, within which the average frequency of the corresponding formant is contained when the segment is pronounced. Each corridor is an interval defined by two frequencies: the highest and the lowest. The segment descriptions 802, 803, or 804 may also contain some algorithms 814 optimized specifically for detection of this segment within a human utterance.

Figure 4:
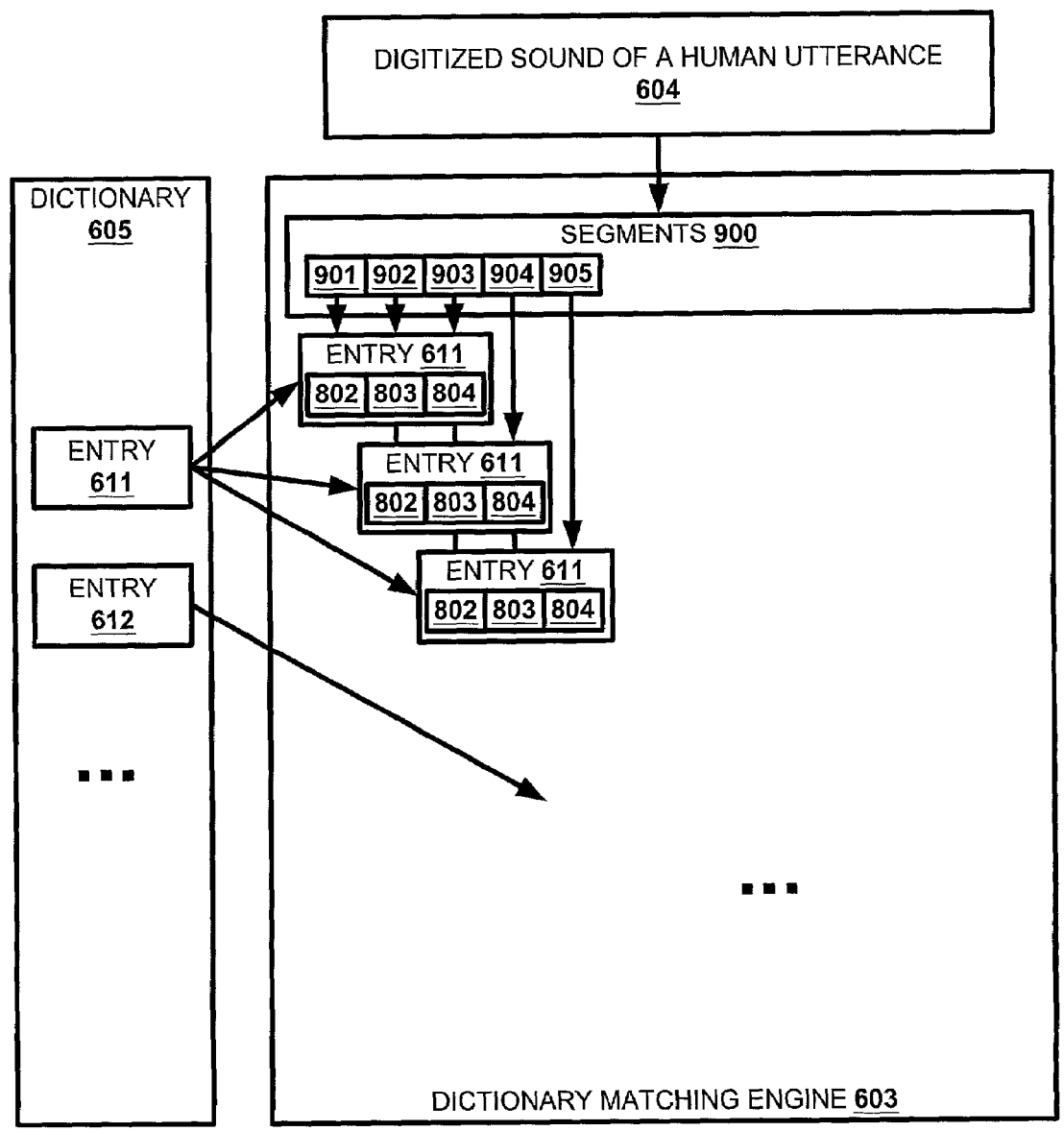
FIG. 4 illustrates the Optimal Inverse Method.

FIG. 4 illustrates the Optimal Inverse Method, it shows the operation of an embodiment of the present invention in the form of a dictionary matching engine 603 working on a digitized sound record 604, divided into a sequence of segments 901-905. Segments 802, 803, 804 of an entry 611 within the dictionary 605 are compared first with segments 901, 902, 903, then with segments 902, 903, 904, and finally with segments 903, 904, 905. The number of segments in each such stretch within sequence 900 must be equal, or almost equal, to the number of segments 825 in the entry 611. Such tested sequences of segments are called tested segment sequences. The substantially equal test is provided by defining a threshold of difference for comparison. After such set of tests is performed on entry 611, the same tests are performed on entry 612, but the length of tested segment stretches within sequence 900 might be different: for example, the entry 611 contains three segments, while the entry 612 may contain four segments. Note that in the implementation shown on FIG. 4, the segments are not necessarily continuous voiced segments. This method of comparison is called the Optimal Inverse Method.

The segmentation of the digitized sound of human utterance of a dictionary entry might produce a number of segments different from the number of segments in the entry. This could be caused by a "non-standard" pronunciation, or imperfections in the sound record or in the segmentation algorithm.

The comparison of segments to determine a substantially equal match is determined by first comparing segments at a given position (n). Then, depending on the type of segment, a different segment at position (n+1) or (n−1) can be compared. The scope of the comparison can be expanded (e.g., vowel, voiced consonant, strong fricative, etc.). For example, segments at position (n+2) or (n−2) can be compared. When a match is found and some segments are either inserted or overlooked, other segments can be shifted accordingly.

For example, if the invention is used to process speech as part of an implementation of a natural language understanding system as described in co-pending U.S. patent application Ser. No. 10/043,998 titled "Method and Apparatus Providing Computer Understanding and Instructions from Natural Language", then the dictionary 605, in the context of that application, is one of the subdictionaries representing domain subject areas and domain subsubject areas. In this way, even though the number of entries in the dictionary can be as large as necessary, the number of entries in each subdictionary can be kept small, thereby providing the matching algorithms fewer entries to compare and thus more efficient recognition processing using the present invention.

Conventional speech recognition systems act on a portion of a representation of a continuous speech sound record and compare that representation to the whole set of entries in the system's dictionary. In contrast, the Optimal Inverse Method compares entries in a small dictionary one by one with the entire length of the segmented sound record (a word, a phrase, a sentence, etc.). This inversion improves the speed and accuracy of recognition processing by allowing the efficient use of the full accumulated knowledge of the dictionary entries during the comparison. The accumulated knowledge includes entry-specific algorithms 801 and segment-specific algorithms 814.

Segment-specific 814 algorithms improve comparison processing at a segment level. Segment-specific 814 algorithms provide ordering for comparisons based on segment type (e.g., voiceless plosive, vowel, voiced fricative, voiced plosive, etc.). The dictionary matching engine 603 can then perform specialized comparison algorithms in optimal order (e.g., a voiceless plosive detecting module first for a voiceless plosive segment). The selection of specialized comparison modules is specific for each segment. Quantitative values of each modules parameters are determined during training and used during the comparison.

Entry-specific algorithms 801 recognize that the above-described module comparison sequence itself forms specific characteristics useful for detection of a word of a given segment composition in a segmented representation of a sound record. An entry specific algorithm 801 can "move along" the segmented representation of a sound record, stopping when having detected a specific segment type (e.g., voiceless plosive) and check the coincidence of types of the rest of its segments. If a coincidence of types exists then a more exacting comparative analysis algorithm can be applied to just those segments and their interconnections (as indicated in the entry). This algorithm provides the final determination regarding the word recognition. Since these algorithms are created and optimized just for a particular word, the quality and speed of the word recognition are greatly improved. The process continues through entries in the dictionary. Once the first entry completes its processing of the entire length of the sound record, the second entry of the dictionary performs similar processing. This continues until all the dictionary entries have been processed or until the sound record is completely recognized. The small number of entries in the dictionary provides the ability to process each dictionary entry along the sound record, instead of processing each supposed word of the sound record through the whole dictionary as it is done in conventional systems.

In one particular embodiment of the present invention, the stressed vowel segment is used as an "anchor" because it is the most energetic and therefore the most reliably detectable. In this particular embodiment the comparison of the rest of segments include both the right and the left segments from the stressed vowel, unlike the use of a first segment as an "anchor", when the comparison includes segments only to the right.

Figure 5:
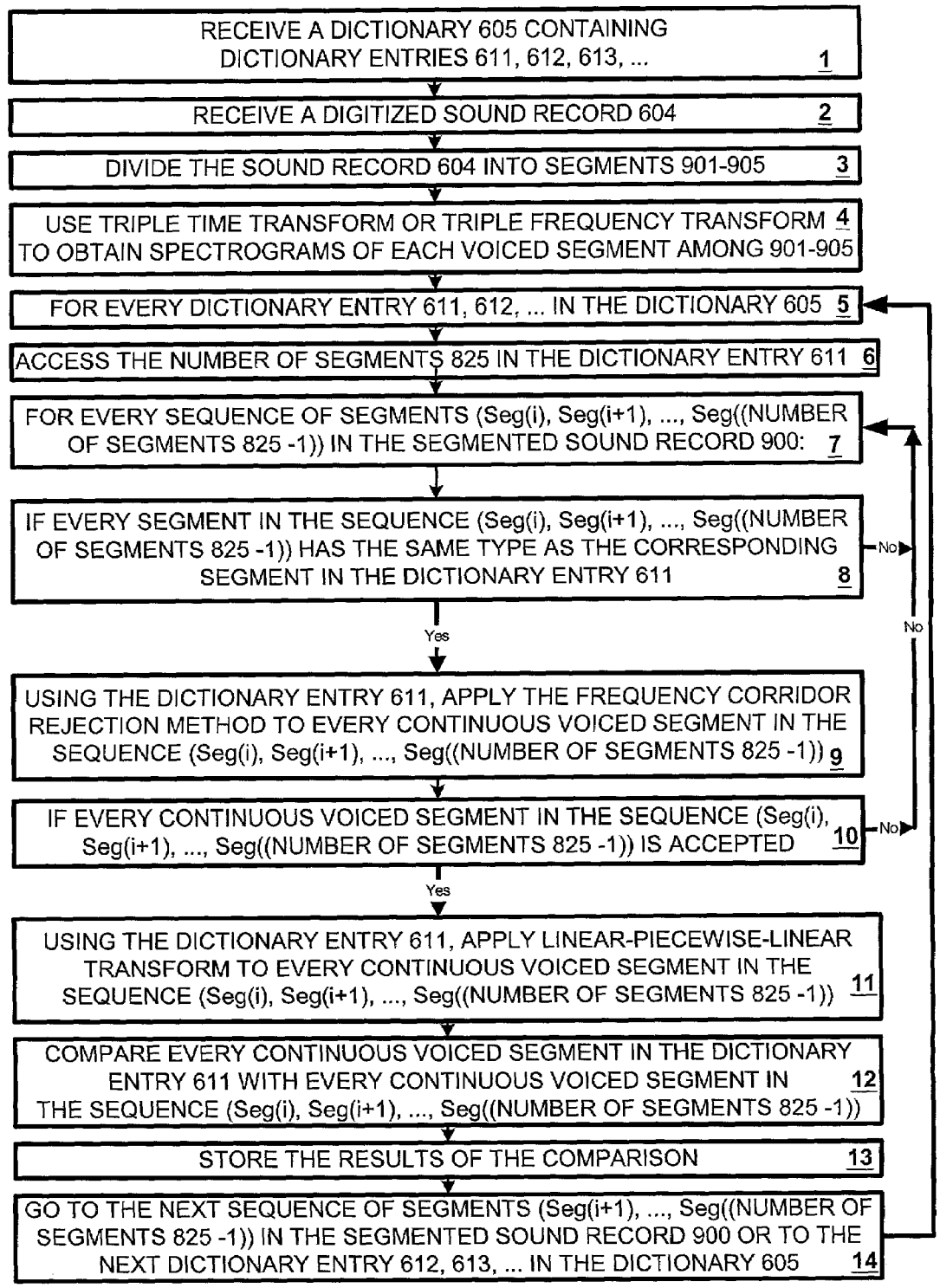
FIG. 5 is a flowchart of a process implementing the present invention including the Optimal Inverse Method.

FIG. 5 is a flowchart of a process implementing the present invention including the Optimal Inverse Method. FIG. 5 shows the operation of an embodiment of the present invention in the form of a method or apparatus processing a sound record of a human utterance 604. Each dictionary entry 611, 612, 613 is compared with each segment sequence of equal, or almost equal, segment length 825 within the sound record 604. This embodiment, in steps 4, 9, and 11, uses other methods and algorithms described in this application.

A voiced sound in human speech has a discrete spectrum of harmonics. A spectrogram is normally obtained for a fixed set of frequencies. The principal task of the two methods described on FIGS. 6, 7, 8, and 9 (Triple Time Transform and Triple Frequency Transform) is to create a spectrogram capturing the most from the harmonics of the voiced sound and the least from the noise inevitably present in any sound record. These methods are designed to account for variability of voice pitch of different speakers and of the same speaker at different times.

The frequency of the basic tone is the frequency of the lowest harmonic within a continuous voiced segment. These methods use the frequency of the basic tone (FBT) 1001 within the sound record of a voiced segment 901, first, to scale the sound record or to scale the analyzing comb of frequencies 1002 and, second, to scale the resulting intermediate spectrogram 1005 or 1102 to obtain the resulting spectrogram 1006 or 1103. For proper scaling results, the frequency dimension of the intermediate spectrograms must have a linear frequency scale.

The resulting spectrograms can be used by dictionary matching engine 603 for segment-by-segment comparison of digitized sound 604 and a dictionary entry 611, 612, or 613. This comparison may occur in the context of the Optimal Inverse Method shown on FIGS. 4 and 5.

Figure 6:
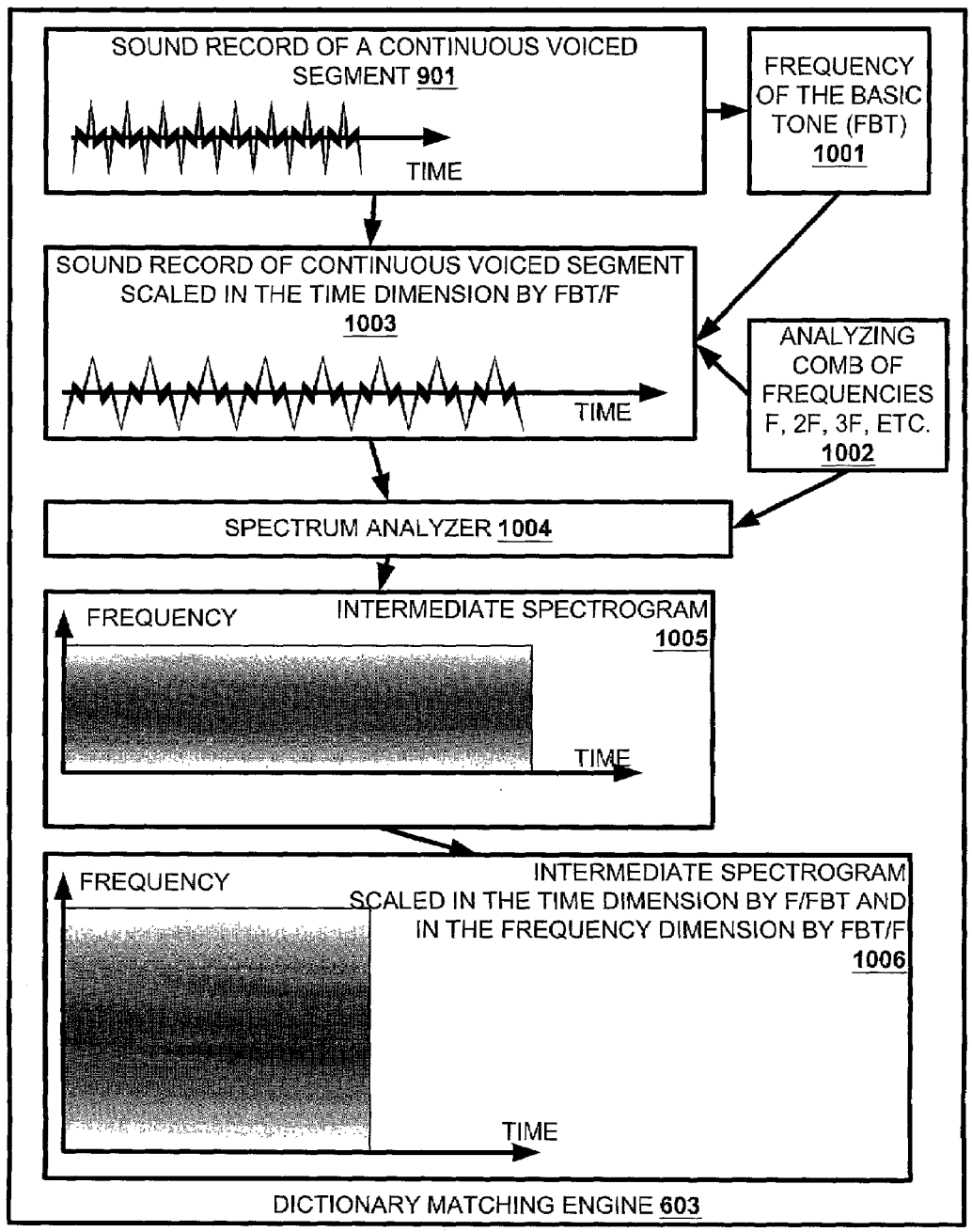
FIG. 6 illustrates the Triple Time Transform method.

FIG. 6 illustrates the Triple Time Transform method, it illustrates an embodiment of the Triple Time Transform method used to obtain a spectrogram 1006 of a continuous voiced segment 900. After the frequency of the basic tone 1001 is determined, the sound record of the continuous voiced is scaled as shown in 1003. This scaled sound record 1003 is then processed, 1004, using a comb of frequencies 1002 to obtain an intermediate spectrogram 1005. The intermediate spectrogram 1005 then has to be scaled in the time dimension to reestablish the original duration of the segment and in the frequency dimension to account for distortion in the frequency pattern caused by the first scaling in 1003.

Figure 7:
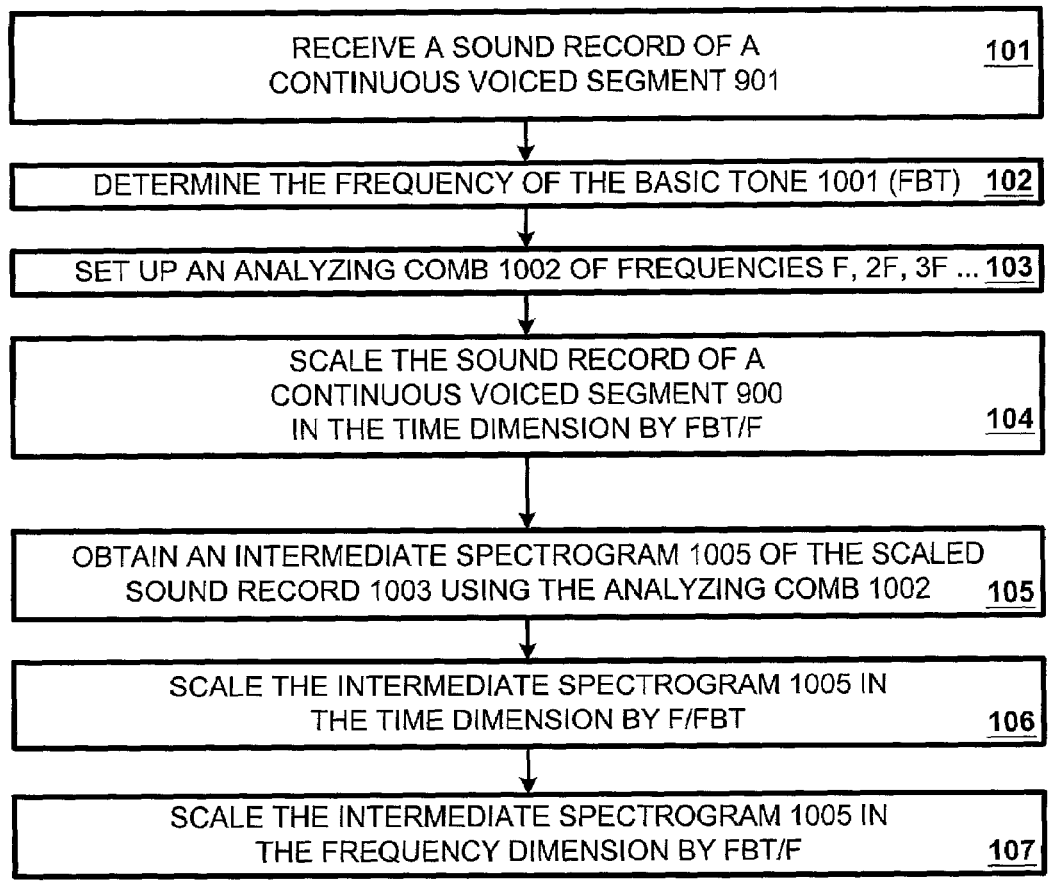
FIG. 7 is a flowchart of a process implementing the Triple Time Transform method.

FIG. 7 is a flowchart of a process implementing the Triple Time Transform method, it shows the operation of an embodiment of the Triple Time Transform method where the spectrogram of the sound of a continuous voiced segment is obtained. At step 101 a sound record of a continuous voiced segment 901 is received. The frequency of the basic tone is determined at step 102. At step 104 the sound record of a continuous voiced segment 901 is scaled in the time dimension by FBT/F (FBT divided by F).

Then an intermediate spectrogram 1005 of the scaled sound record 1003 is obtained using the analyzing comb 1002 (step 105). At step 106 the intermediate spectrogram 1005 is scaled in the time dimension by F/FBT (F divided by FBT). Finally, the intermediate spectrogram 1005 is scaled in the frequency dimension by FBT/F at step 107.

Figure 8:
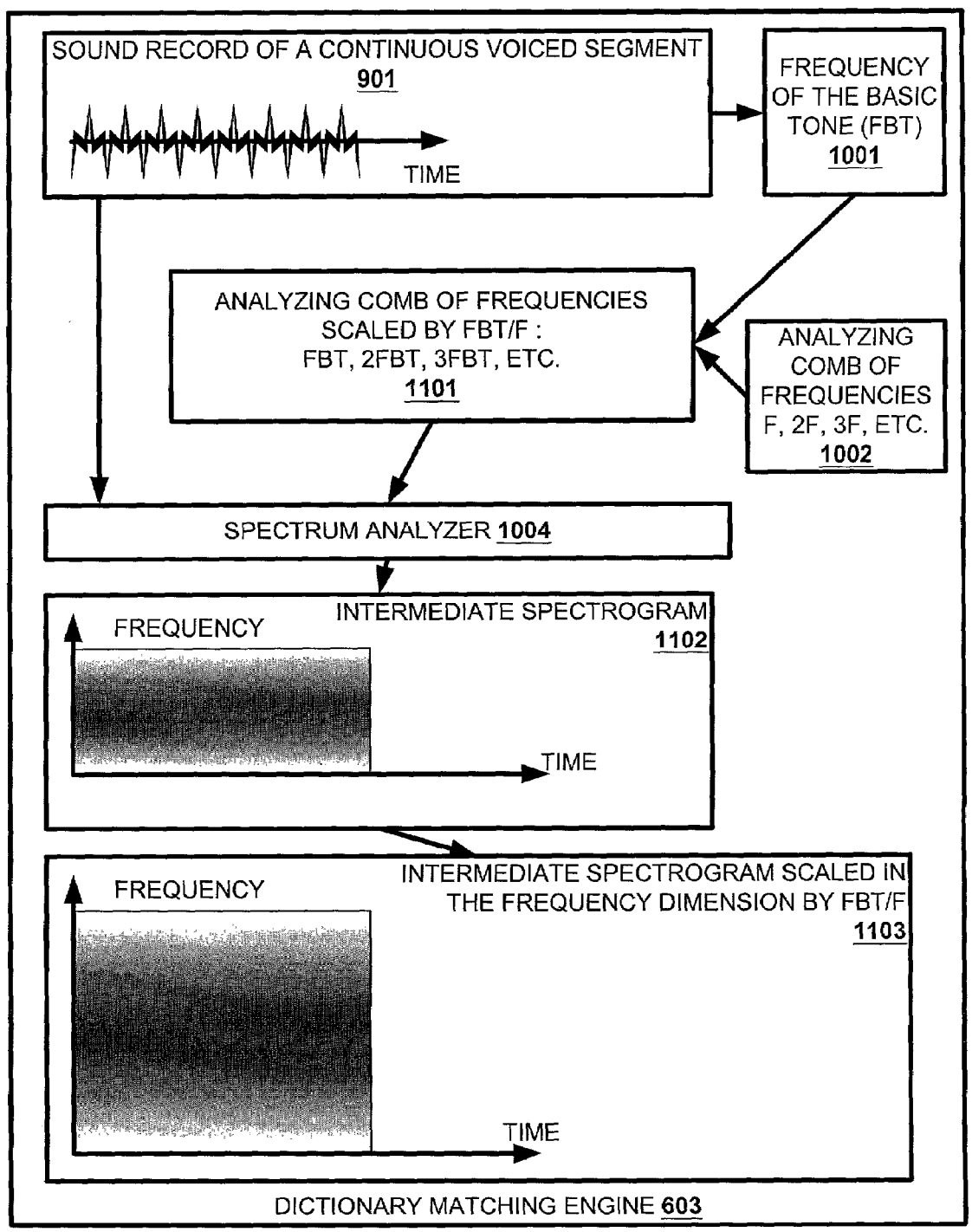
FIG. 8 illustrates the Triple Frequency Transform method.

FIG. 8 illustrates the Triple Frequency Transform method, it illustrates an embodiment of the Triple Frequency Transform method as used to obtain a spectrogram 1103 of continuous voiced segment 901. After the frequency of the basic tone 1001 is determined, the analyzing comb of frequencies 1002 is scaled as shown in 1101. The sound record of continuous voiced segment 901 is then processed, 1004, using the scaled comb of frequencies 1101 to obtain an intermediate spectrogram 1102. The intermediate spectrogram 1102 then has to be scaled in the frequency dimension to account for distortion in the frequency pattern caused by the scaling of the analyzing comb of frequencies in 1101.

Figure 9:
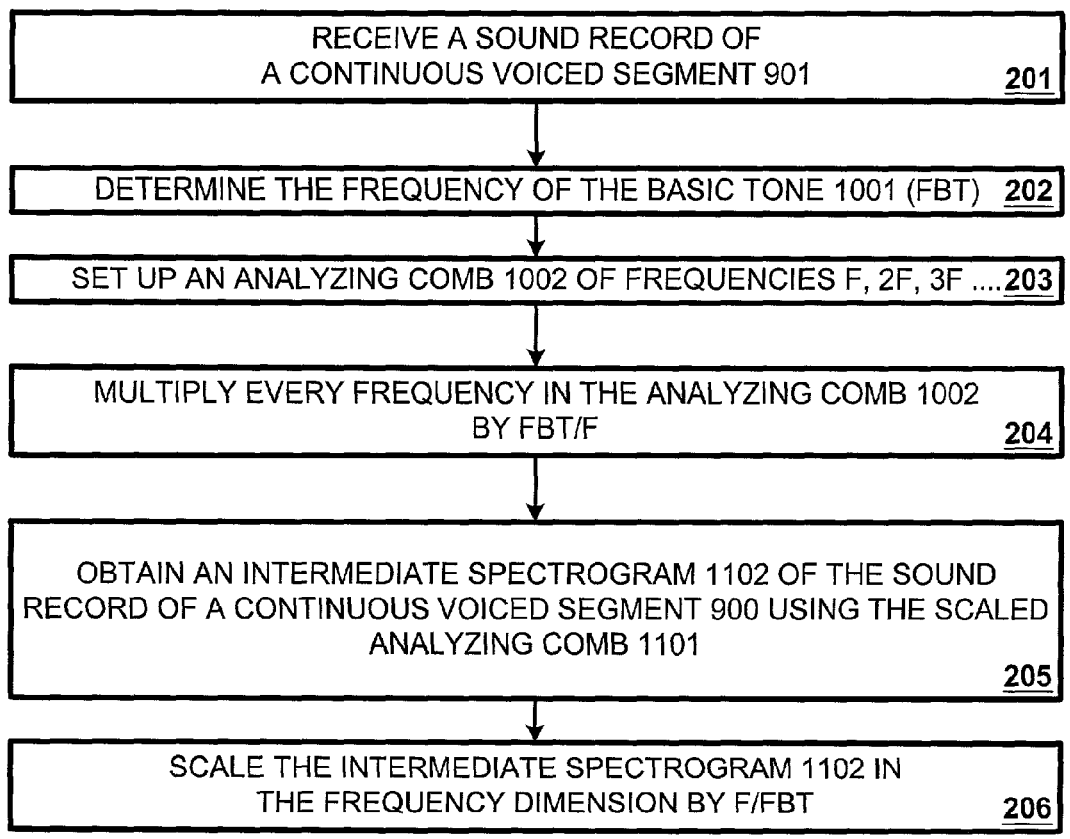
FIG. 9 is a flowchart of a process implementing the Triple Frequency Transform method.

FIG. 9 is a flowchart of a process implementing the Triple Frequency Transform method. FIG. 9 shows the operation of an embodiment of the Triple Frequency Transform method where the spectrogram of the sound of a continuous voiced segment is obtained. At step 201 a sound record of a continuous voiced segment 900 is received. The frequency of the basic tone 1001 is determined at step 202. At step 203 an analyzing comb 1002 of frequencies (F, 2F, 3F . . . ) is set up. Every frequency in the analyzing comb 1002 is then multiplied by FBT/F. The sound record of continuous voiced segment 900 is then obtained using the scaled comb of frequencies 1101 (step 205). At step 206 the intermediate spectrogram 1102 is scaled in the frequency dimension by F/FBT.

Figure 10:
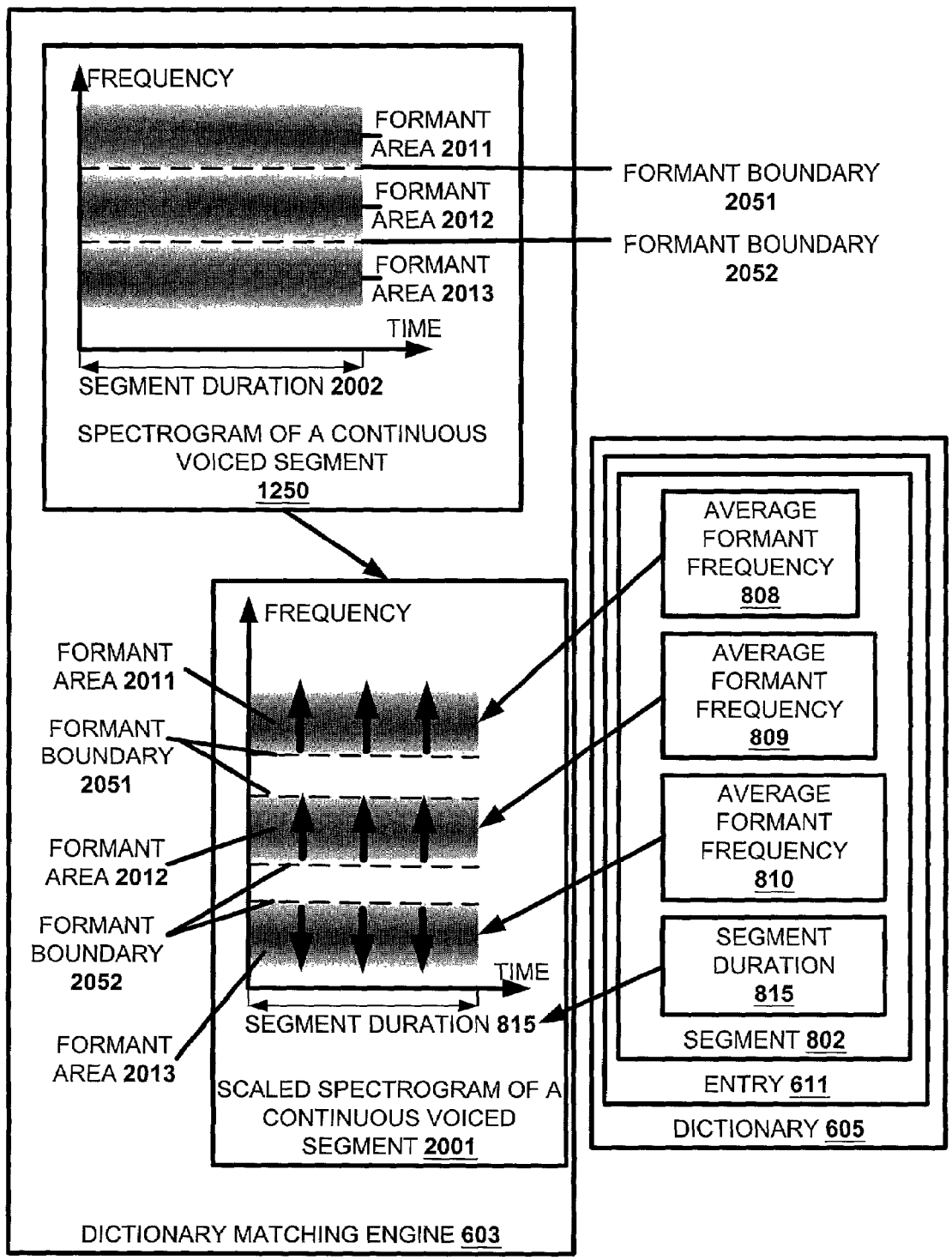
FIG. 10 illustrates the Linear-Piecewise-Linear Transform method.

FIG. 10 illustrates the Linear-Piecewise-Linear Transform method. The Linear-Piecewise-Linear Transform method can be used by dictionary matching engine 603 for comparison of continuous voiced segments in digitized sound 604 and in a dictionary entry 611, 612, or 613 to account for variability of relative sizes of the elements of the voice tract (mouth, nose, and throat cavities, etc.) between different people and for variations in pronunciation. This approach is useful when the dictionary entries 611, 612, 613 contain information only about a particular standard realization of their continuous voiced segments. This comparison may occur in the context of the Optimal Inverse Method shown on FIGS. 4 and 5.

Figure 11:
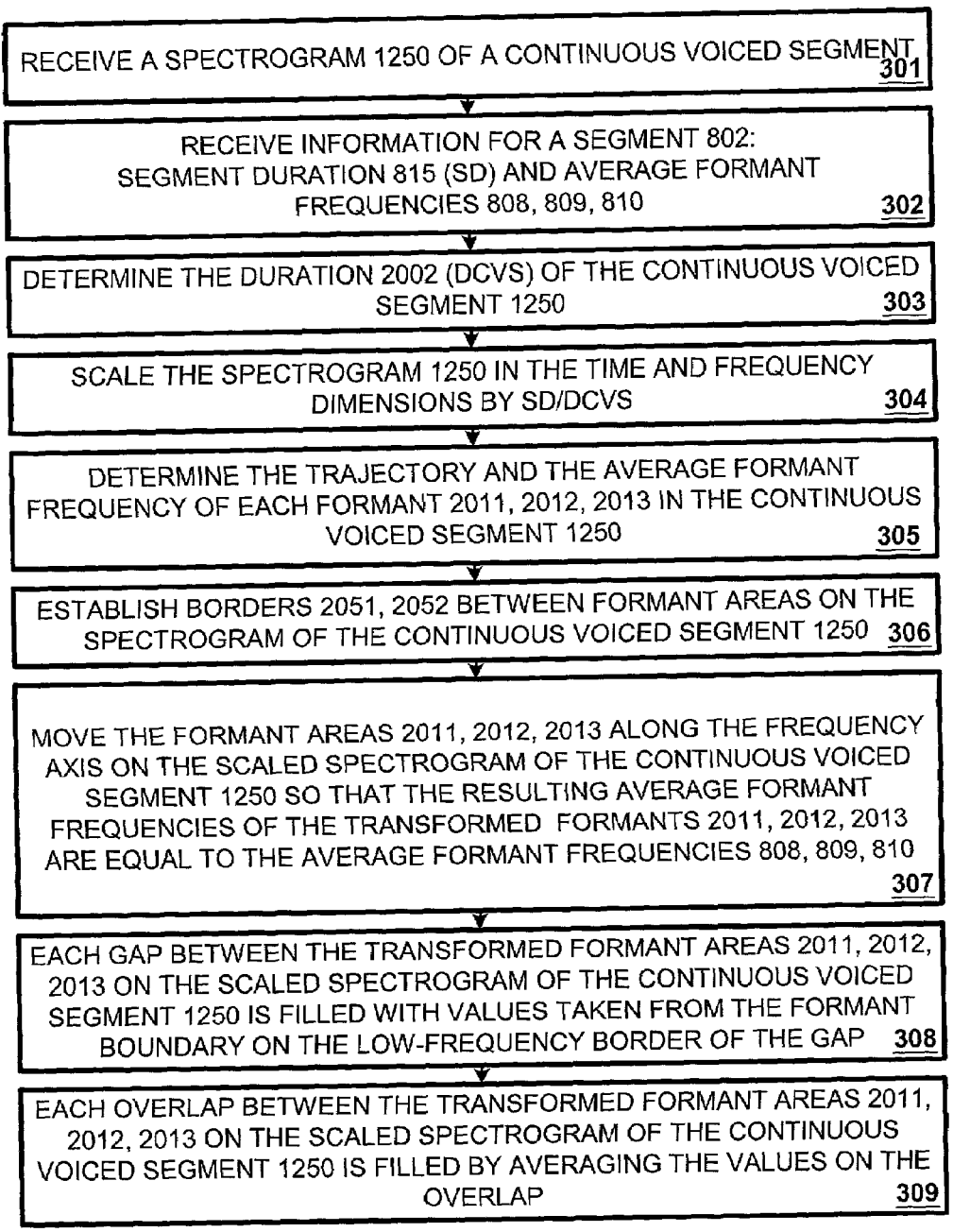
FIG. 11 is a flowchart of a process implementing the Linear-Piecewise-Linear Transform method.

In the embodiment illustrated on FIGS. 10 and 11, the Linear-Piecewise-Linear Transform is performed in two stages. First, the spectrogram of the continuous voiced segment 1250 in human utterance is scaled by the same factor in the frequency and time dimensions, so that the duration of the resulting spectrogram 2001 is equal to the duration of the tested dictionary segment 815. In FIG. 11, this stage is performed in steps 301, 302, 303, and 304.

The second stage of the embodiment of the Linear-Piecewise-Linear Transform illustrated on FIGS. 10 and 11 requires determining boundaries of formant areas on the scaled spectrogram of the continuous voiced segment under consideration. In FIG. 11, the second stage is performed in steps 305, 306, 307, 308, and 309. A boundary between formant areas, a formant boundary, is defined as a line equidistant from two adjacent formant trajectories. These boundaries divide the entire analyzed spectrogram into several non-overlapping formant areas, each area containing a single formant. On FIG. 10 the formant boundaries 2051 and 2052 separate formant areas 2011, 2012, and 2013.

After the formant areas are defined on the scaled spectrogram of the continuous voiced segment 2001, they are moved along the frequency axis until the time-averaged frequency of the transformed formant is equal to the average formant frequency 808, 809, 810 of the corresponding formant in the tested dictionary entry 611, 612, or 613.

This movement of formant areas along the frequency axis must not alter the order in which the formant areas are arranged along the frequency axis, in other words, there must be no reordering or reshuffling. However, as the result of these parallel transforms, some formant areas may end up overlapping each other, and gaps may appear between other formant areas. FIG. 10 shows two such gaps on the spectrogram 2001.

An embodiment of Linear-Piecewise-Linear Transform handles the overlaps by averaging the spectrogram values within the overlapping areas. An embodiment of Linear-Piecewise-Linear Transform handles the gaps by interpolating the spectrogram values on the borders of the gaps. An embodiment of Linear-Piecewise-Linear Transform fills the gaps with the spectrogram values on the gap boundary at the bottom, low frequency end of the gap.

The result of the Linear-Piecewise-Linear Transform is a normalized spectrogram which then can be compared with a prototype spectrogram for a segment in a dictionary entry in the dictionary matching engine 603.

FIG. 11 is a flowchart of a process implementing the Linear-Piecewise-Linear Transform method. At step 301 a spectrogram 1250 of a continuous voiced segment 901 is received. At step 302 characteristics of a segment 802, 803, 804 including segment duration (SD) 815 and average formant frequencies 808, 809 and 810 are received. The duration (DCVS) 2002 of the continuous voiced segment 1250 is then determined (step 303). At step 304 the spectrogram 1250 is scaled in the time and frequency dimensions by SD/DCVS. The trajectory and the average formant frequency of each formant 2011, 2012, 2013 in the continuous voiced segment 1250 is determined (step 305). Borders 2051, 2052 are established between formant areas on the spectrogram of the continuous voiced segment 1250 at step 306. At step 307 the formant areas 2011, 2012, 2013 are moved along the frequency axis on the scaled spectrogram of the continuous voiced segment 1250 so that the resulting average formant frequencies of the transformed formants 2011, 2012, 2013 are equal to the average formant frequencies 808, 809, 810. Each gap between the transformed formant areas 2011, 2012, 2013 on the scaled spectrogram of the continuous voiced segment 1250 is filled with values taken from the formant boundary on the low-frequency border of the gap at step 308. Finally, each overlap between the transformed formant areas 2011, 2012, 2013 on the scaled spectrogram of the continuous voiced segment 1250 is filled by averaging the values on the overlap (step 309).

Figure 12:
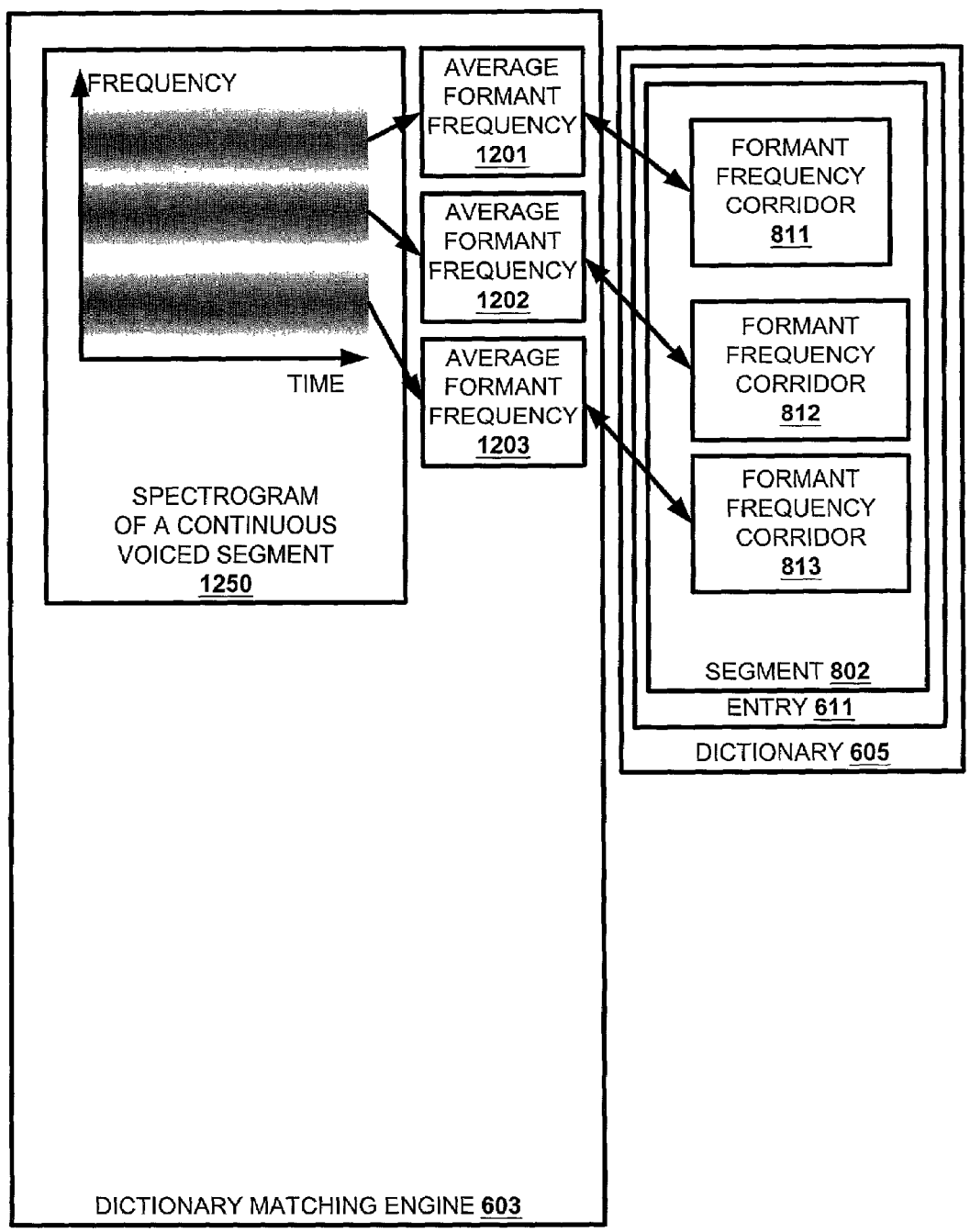
FIG. 12 illustrates the frequency corridor rejection method.

FIG. 12 illustrates an embodiment of the frequency corridor rejection method. In an embodiment of the present invention, the frequency corridor rejection method is used by the dictionary matching engine 603 to quickly determine whether a tested segment sequence within the segmented sound of human utterance 900 is incapable of matching a given dictionary entry. This comparison may occur in the context of Optimal Inverse Method shown on FIGS. 4 and 5.

When a spectrogram of a continuous voiced segment 1250 is compared with a dictionary segment 802, 803, or 804, the frequency corridor rejection method involves first calculating the time-averaged frequency 1201, 1202, 1203 for every formant in the analyzed continuous voiced segment 1250 and then checking whether this number for each formant is within the corresponding corridor 811, 812, or 813 specified in the dictionary 605 for the segment 802, 803, or 804. If any average frequency 1201, 1202, 1203 is found to be outside its corridor 811, 812, or 813 specified in the dictionary 605, the continuous voiced segment 1250 cannot be the sound of a human uttering the dictionary segment under consideration and therefore must be rejected.

Any rejection under the frequency corridor rejection method in the context of the Optimal Inverse Method shown on FIGS. 4 and 5 would cause the entire tested segment sequence to fail the comparison with the tested dictionary entry.

Figure 13:
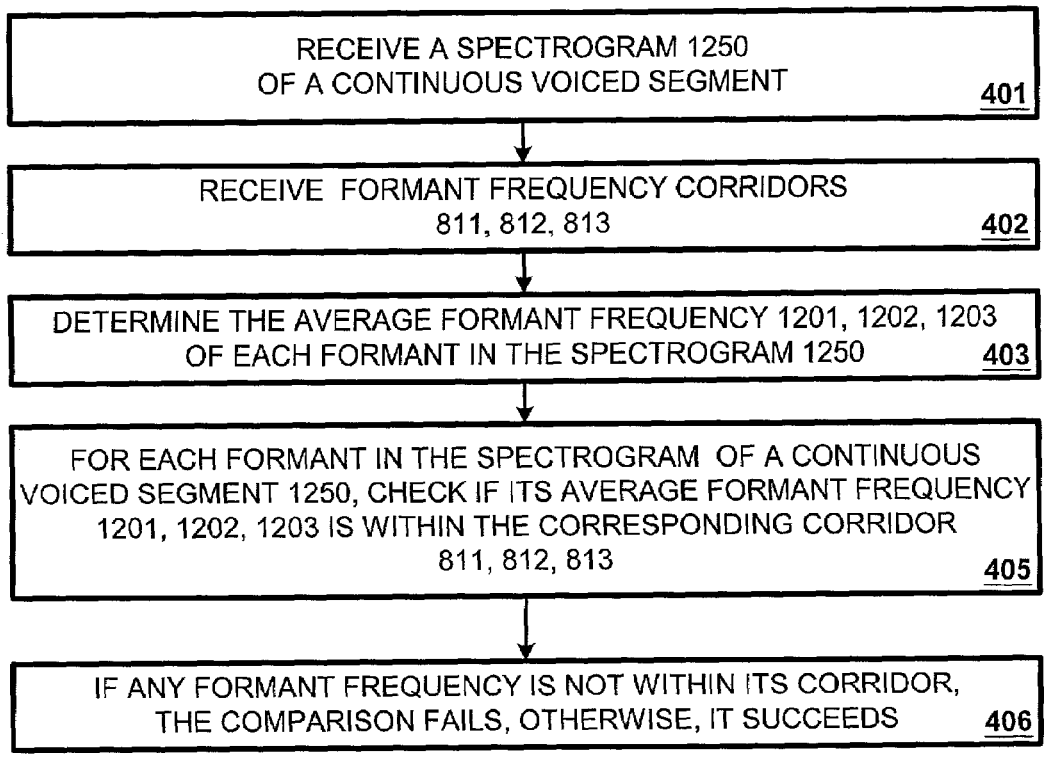
FIG. 13 is a flowchart of a process implementing the frequency corridor rejection method.

FIG. 13 shows the operation of an embodiment of the frequency corridor rejection method where the spectrogram of the sound of a continuous voiced segment is analyzed, compared with a segment in a dictionary entry, and is either accepted or rejected.

Those of ordinary skill in the art should recognize that methods involved in a speech recognition system using spectrogram analysis may be embodied in a computer program product that includes a computer usable medium. For example, such a computer usable medium can include a readable memory device, such as a solid state memory device, a hard drive device, a CD-ROM, a DVD-ROM, or a computer diskette, having stored computer-readable program code segments. The computer readable medium can also include a communications or transmission medium, such as a bus or a communications link, either optical, wired, or wireless, carrying program code segments as digital or analog data signals.

While the system has been particularly shown and described with references to particular embodiments, it will be understood by those of ordinary skill in the art that various changes in form and details may be made without departing from the scope of the invention encompassed by the appended claims. For example, the methods of the invention can be applied to various environments, and are not limited to the described environment. Also, most comparison in the description are illustrated as segment to segment comparisons, a person of ordinary skill in the art will recognize that groups of segments can be compared to other groups of segments (e.g., dictionary entries) in like manner.

The invention claimed is:

1. A data processing method for recognizing a sound record of a human utterance, comprising:
   dividing the sound record into a sequence of one or more segments;
   comparing a plurality of dictionary entries with the sound record, each dictionary entry being incrementally compared with a continuous stretch of segments of the sound record; and wherein vocalized parts of the sound record are represented as a spectrogram, optimized for comparison with the dictionary entries using a method selected from a group consisting of a triple time transform, a triple frequency transform, a linear-piecewise-linear transform, and combinations thereof.

2. The method of claim 1 further comprising:
for a dictionary entry, determining an expected number of segments associated with the dictionary entry.

3. The method of claim 2 wherein comparing comprises:
for the dictionary entry, testing each continuous stretch of the sound record having a segment length substantially equal to the expected number of segments.

4. The method of claim 1 wherein dividing is based on phonemes.

5. The method of claim 1 wherein dividing includes detecting segments comprising at least one of the following types: vowel stressed, vowel unstressed, adjacent voiced consonant, voiced fricative, voiceless fricative, voiced plosive, voiceless plosive, pause or unrecognized.

6. The method of claim 1 wherein the triple time transform comprises:
scaling the vocalized parts of the sound record by a scaling factor in the time dimension;
obtaining a spectrogram of the scaled vocalized parts of the sound record using a method optimized for a reference frequency;
scaling the spectrogram by the inverse of the scaling factor in the time dimension; and
scaling the spectrogram by the scaling factor in the frequency dimension.

7. The method of claim 6 further comprising:
calculating a characteristic pitch frequency of the scaled vocalized parts of the sound record; and
calculating the scaling factor by comparing the characteristic pitch frequency with the reference pitch frequency.

8. The method of claim 6 wherein the scaling the vocalized parts of the sound record comprises scaling a sound record of a voiced segment of a human utterance.

9. The method of claim 8 further comprising:
selecting a characteristic formant within the voiced segment;
calculating a characteristic frequency of the characteristic formant of the voiced segment; and
calculating the scaling factor by comparing the characteristic pitch frequency with the reference pitch frequency.

10. The method of claim 1 wherein the triple frequency transform comprises:
obtaining a scaled set of frequencies by multiplying each frequency in a reference set of frequencies by a scaling factor; and
obtaining a spectrogram of a sound record using the scaled set of frequencies.

11. The method of claim 10 further comprising:
calculating a characteristic pitch frequency of a sound for the sound record; and
calculating the scaling factor by comparing the characteristic pitch frequency with the reference pitch frequency.

12. The method of claim 10 wherein obtaining the spectrogram of the sound record comprises scaling a spectrogram of a sound record of a voiced segment of a human utterance.

13. The method of claim 12 further comprising:
selecting a characteristic formant within the voiced segment;
calculating a characteristic frequency of the characteristic formant of the voiced segment; and
calculating the scaling factor by comparing the characteristic pitch frequency with the reference pitch frequency.

14. The method of claim 1 where the linear-piecewise-linear transform comprises:
scaling an analyzed spectrogram in the time and frequency dimensions using a scaling factor;
dividing the scaled spectrogram into one or more non-overlapping formant areas, each formant area essentially spanning the duration of the scaled spectrograph;
for each formant area, calculating a characteristic frequency;
for each formant area, choosing a reference frequency from at least one reference frequency associated with a prototype continuous voiced segment;
moving each formant area along the frequency axis on the spectrogram so that the characteristic frequency of each formant area in its moved state is equal to the reference frequency chosen for the formant area;
assigning to each overlap point on the spectrogram, where a plurality of formant areas overlap after the movement of the formant areas, a value equal to an average of the spectrogram values of the overlapping formant areas at the overlap point after the movement;
locating on the spectrogram a gap point to which no value is assigned after the movement of the formant areas;
for the gap point, choosing a non-gap point; and
assigning to the gap point a value equal to the value of the spectrogram at the non-gap point.

15. The method of claim 14 wherein choosing the non-gap point for the gap point comprises choosing a non-gap point on the spectrogram at the same time as and at higher frequency than the gap point, so that all the points on a straight line connecting the gap point and the chosen non-gap point on the spectrogram are gap points.

16. The method of claim 14 further comprising calculating the scaling factor by comparing the duration of the spectrogram with the duration of the prototype continuous voiced segment.

17. The method of claim 14 wherein each formant area includes only one formant crest.

18. The method of claim 14 wherein each formant crest spans the entire duration of the spectrogram.

19. The method of claim 14 wherein the border between any two adjacent formant areas is equidistant from formant crests in the adjacent formant areas.

20. The method of claim 1, wherein comparing includes of comparing the spectrogram of a continuous voiced segment with a prototype continuous voiced segment by:
locating one or more formants on an analyzed spectrogram;
calculating a characteristic frequency for each formant;
assigning to each formant on the analyzed spectrogram a corresponding formant in a prototype continuous voiced segment; and
for each characteristic frequency, determining whether the characteristic frequency falls within a frequency interval associated with the corresponding formant.

21. A data processing system for recognizing a sound record of a human utterance, comprising:
a segmentation engine for dividing the sound record into a sequence of one or more segments;

a comparison engine for comparing a plurality of dictionary entries with the sound record, each dictionary entry bring incrementally compared with a continuous stretch of segments of the sound record; and wherein vocalized parts of the sound record are represented as a spectrogram, optimized for comparison with the dictionary entries using a method selected from a group consisting of a triple time transform, a triple frequency transform, a linear-piecewise-linear transform and combinations thereof.

22. The system of claim 21 further comprising:
for a dictionary entry, an algorithm for determining an expected number of segments associated with the dictionary entry.

23. The system of claim 22 wherein the comparison engine comprises:
for the dictionary entry process, testing each continuous stretch of the sound record having a segment length substantially equal to the expected number of segments.

24. The system of claim 21 wherein the segmentation engines divides based on phonemes.

25. The system of claim 21 wherein the segmentation engine detects segments comprising at least one of the following types: vowel stressed vowel unstressed, adjacent voiced consonant, voiced fricative, voiceless fricative, voiced plosive, voiceless plosive, pause, or unrecognized.

26. The system of claim 21 wherein the triple time transform comprises:
a scaling factor for scaling the vocalized parts of the sound record in the time dimension;
a spectrogram of the scaled vocalized parts of the sound record optimized for a reference frequency;
an algorithm for scaling the spectrogram by they inverse of the scaling factor in the time dimension; and
an algorithm for scaling the spectrogram by the scaling factor in the frequency dimension.

27. The system of claim 26 further comprising:
an algorithm for calculating a characteristic pitch frequency of sound for the sound record; and
an algorithm for calculating the scaling factor by comparing the characteristic pitch frequency with the reference pitch frequency.

28. The system of claim 26 wherein the scaling the vocalized parts of the sound record comprises scaling a sound record of a voiced segment of a human utterance.

29. The system of claim 28 further comprising:
a characteristic formant selected from within the voiced segment;
an algorithm for calculating a characteristic frequency of the characteristic formant of the voiced segment; and
an algorithm for calculating the scaling factor by comparing the characteristic pitch frequency with the reference pitch frequency.

30. The system of claim 21 wherein the triple frequency transform comprises:
a scaled set of frequencies obtained by multiplying each frequency in a reference set of frequencies by a scaling factor; and
a spectrogram of a vocalized segment of a sound record obtained using the scaled set of frequencies.

31. The system of claim 30 further comprising:
an algorithm for calculating a characteristic pitch frequency of sound for the sound record; and
an algorithm for calculating the scaling factor by comparing the characteristic pitch frequency with the reference pitch frequency.

32. The system of claim 30 wherein the spectrogram of the vocalized segment of the sound record comprises a spectrogram of a sound record of a voiced segment of a human utterance.

33. The system of claim 32 further comprising:
a characteristic formant within the voiced segment;
an algorithm for calculating a characteristic frequency of the characteristic formant of the voiced segment; and
an algorithm for calculating the scaling factor by comparing the characteristic pitch frequency with the reference pitch frequency.

34. The system of claim 21 wherein the linear-piecewise-linear transform comprises:
an analyzed spectrogram sealed in the time and frequency dimensions by a scaling factor;
an algorithm for dividing the scaled spectrogram into one of more non-overlapping formant areas, each formant area essentially spanning the duration of the scaled spectrograph;
for each area, a calculated characteristic frequency;
for each formant area, a reference frequency chosen from at least one reference frequency associated with a prototype continuous voiced segment;
an algorithm for moving each formant area along the frequency axis on the spectrogram so that the characteristic frequency of each formant area in its moved state is equal to the reference frequency chosen for the formant area;
an algorithm for assigning to each overlap point on the spectrogram, where a plurality of formant areas overlap after the movement of the formant areas, a value equal to an average of the spectrogram values of the overlapping formant areas at the overlap point alter the movement;
an algorithm for Locating on the spectrogram a gap point to which no value is assigned after the movement of the formant areas;
for the gap point a chosen non-gap point; and
a value assigned to the gap point equal to the value of the spectrogram at the non-gap point.

35. The system of claim 34 wherein the non-gap paint chosen for the gap point comprises a non-gap point on the spectrogram at the same time as and at higher frequency than the gap point, so that all the points on a straight line connecting the gap point and the chosen non-gap point on the spectrogram are gap points.

36. The system of claim 34 further comprising calculating the scaling factor by comparing the duration of the spectrogram with the duration of the prototype continuous voiced segment.

37. The system of claim 34 wherein each formant area includes only one formant crest.

38. The system of claim 34 wherein each formant crest spans the entire duration of the spectrogram.

39. The system of claim 34 wherein the border between any two adjacent formant areas is equidistant from formant crests in the adjacent formant areas.

40. The system of claim 21 wherein the comparison includes a comparison of spectrogram of a continuous voiced segment with a prototype continuous voiced segment by:
locating one or more formants on an analyzed spectrogram;
calculating a characteristic frequency for each formant;
assigning to each formant on the analyzed spectrogram a corresponding formant in a prototype continuous voiced segment; and for each characteristic frequency, determining whether the characteristic frequency falls within a frequency interval associated with the corresponding formant.

41. A computer program product comprising:

A computer usable medium; and

A data processing method stored on the medium for recognizing a sound record of a human utterance, comprising computer instructions for:

dividing the sound record into a sequence of one or more segments;

comparing a plurality of dictionary entries with the sound record, each dictionary entry being incrementally compared with a continuous stretch of segments of the sound record; and wherein vocalized parts of the sound record are represented as a spectrogram, optimized for comparison with the dictionary entries using a method selected from a group consisting of a triple time transform, a triple frequency transform, a linear-piecewise-linear transform, and combinations thereof.

* * * * *